United States Patent
Bean et al.

(10) Patent No.: US 10,319,044 B2
(45) Date of Patent: Jun. 11, 2019

(54) TRANSACTION FUNCTIONALITY IN A MULTIDIMENSIONAL DATABASE

(71) Applicant: Oracle International Corporation, Redwood Shores, CA (US)

(72) Inventors: Donald Wayne Bean, Pleasanton, CA (US); Dinesh Balebail, Milpitas, CA (US); Shailesh Phansalkar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 381 days.

(21) Appl. No.: 15/332,238

(22) Filed: Oct. 24, 2016

(65) Prior Publication Data
US 2017/0116683 A1    Apr. 27, 2017

Related U.S. Application Data

(60) Provisional application No. 62/246,017, filed on Oct. 24, 2015.

(51) Int. Cl.
*G06F 17/30* (2006.01)
*G06Q 40/00* (2012.01)
*G06Q 40/02* (2012.01)

(52) U.S. Cl.
CPC .......... *G06Q 40/128* (2013.12); *G06Q 40/02* (2013.01)

(58) Field of Classification Search
CPC ...................................... G06F 17/30
USPC ................................................ 705/33
See application file for complete search history.

(56) References Cited

U.S. PATENT DOCUMENTS

| | | | |
|---|---|---|---|
| 2008/0010237 A1* | 1/2008 | Sudhakar | G06F 17/30333 |
| 2015/0227597 A1* | 8/2015 | Ng | G06F 17/30557 707/602 |

* cited by examiner

*Primary Examiner* — Russell S Glass
(74) *Attorney, Agent, or Firm* — Potomac Law Group, PLLC (57) ABSTRACT

Systems and methods that enable transaction oriented functions for a multidimensional database are provided. The systems and methods store a plurality of transactions in a multidimensional database, generate a first dimension including respective balances resulting from each of the transactions, and generate a second dimension identifying respective rules corresponding to each of the transactions.

20 Claims, 9 Drawing Sheets

TRANSACTION FUNCTIONALITY IN A MULTIDIMENSIONAL DATABASE

PRIORITY

This application claims the benefit of U.S. Provisional Application Ser. No. 62/246,017, which was filed on Oct. 24, 2015, and which is incorporated herein by reference in its entirety.

FIELD

The embodiments of the present invention generally relate to multidimensional databases and, more particularly to transaction oriented functions for a multidimensional database.

BACKGROUND

Today, companies are under increasing pressure to provide accurate and reliable information faster and more efficiently to both internal and external decision makers. Often, the information required is financial data. However, the systems used to log transactions have traditionally been separate from the tools used to analyze the data. One example of a system used to log transactions is an online transaction processing ("OLTP") system. An example of a system used to analyze data is an online analytical processing ("OLAP") system.

OLTP systems manage applications that are transaction oriented, and are typically implemented using relational databases. Companies generally account for financial information using a ledger (which also may be referred to as a relational database) or other spreadsheet. These ledgers offer easy data entry and maintenance of the accounting information. However, studying the information in the ledger is cumbersome, and complex analysis is often not feasible.

A ledger may be created in a relational database to store financial transactions called "journal entries." When a business transaction occurs, a journal entry is inserted into a table associated with the ledger. Journal entries may be inserted into a general ledger or sub-ledgers. In accounting, a general ledger ("GL") is one of the main financial records of a business. The general ledger includes more or less all of the accounts which are reported on the financial statements, such as cash, accounts payable, and expense accounts. Each ledger in the general ledger typically keeps a balance, or the running total of money, in each account for which the business wishes to track. A sub-ledger may represent accounts payable or accounts receivable, or any other type of ledger, for example.

Each account for which journal entries are made is represented in a "chart of accounts." A chart of accounts is a collection of account names. Small businesses may wish to track a small number of accounts, but large businesses commonly wish to track thousands or even millions of accounts. These accounts may correspond with different departments, organizations, or operational units within the business, as well as different product lines.

Although OLTP systems are simple to implement and efficient for processing transactions, generating reports from an OLTP system can be inefficient and time consuming. For example, it may be possible to determine revenues for one subsidiary over a predetermined amount of time. However, it may be very difficult or impossible to determine revenues for 15 foreign subsidiaries from selling a particular product during different times. The reason is that the data in the ledger is not stored in a manner where complex queries are easily made. Reports in OLTP systems are typically not pre-aggregated with balance information, and must therefore be executed each time the information is needed. Traditionally, complex reports generated from relational database systems are run during a prescheduled time, or from backup databases for this reason.

By contrast, OLAP systems are capable of generating complex reports in an extremely efficient manner. OLAP systems support analysis and management reporting applications, and are often implemented in a multidimensional database that stores data in "cubes." In contrast to relational database tables, which store data in two dimensions similar to a spreadsheet, OLAP cubes can store data in many dimensions, with each dimension representing a different view of the data. For example, a financial application may include dimensions for each fiscal quarter, a dimension for each year, and a dimension for each type of currency. Once data is stored in the OLAP system, all views are automatically populated or pre-aggregated, allowing all information defined by a particular view to be accessed instantaneously. Although OLAP systems are well-suited to generate complex reports, they have limited transactional capabilities.

SUMMARY

The embodiments of the present invention are generally directed to systems and methods that enable transaction oriented functions for a multidimensional database that substantially improve upon the related art.

Features and advantages of the embodiments are set forth in the description which follows, or will be apparent from the description, or may be learned by practice of the invention.

For example, the embodiments are generally directed to systems and methods that enable transaction oriented functions for a multidimensional database. The systems and methods store a plurality of transactions in a multidimensional database, generate a first dimension including respective balances resulting from each of the transactions, and generate a second dimension identifying respective rules corresponding to each of the transactions.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

The embodiments of the present invention are generally related to a multidimensional data structure and a multidimensional database that receives financial information and tracks computations and other transactions to the financial information, such as the allocation of funds from point-to-point. In an example embodiment, the multidimensional transaction modules are configured to visually depict the movement of the funds from point-to-point, based on rules, on both the sending and receiving side, in one or more steps (i.e., "rules"). Every step of an allocation can have one or more corresponding rules. Further, the embodiments provide the ability to roll back the movement of funds to show each corresponding rule and its impact on the data, as well as rolling back transactions, rule by rule, to determine the impact of each rule, all the way to the starting point of a transaction (e.g., point where a certain fund was received).

Reference will now be made in detail to the embodiments of the present invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
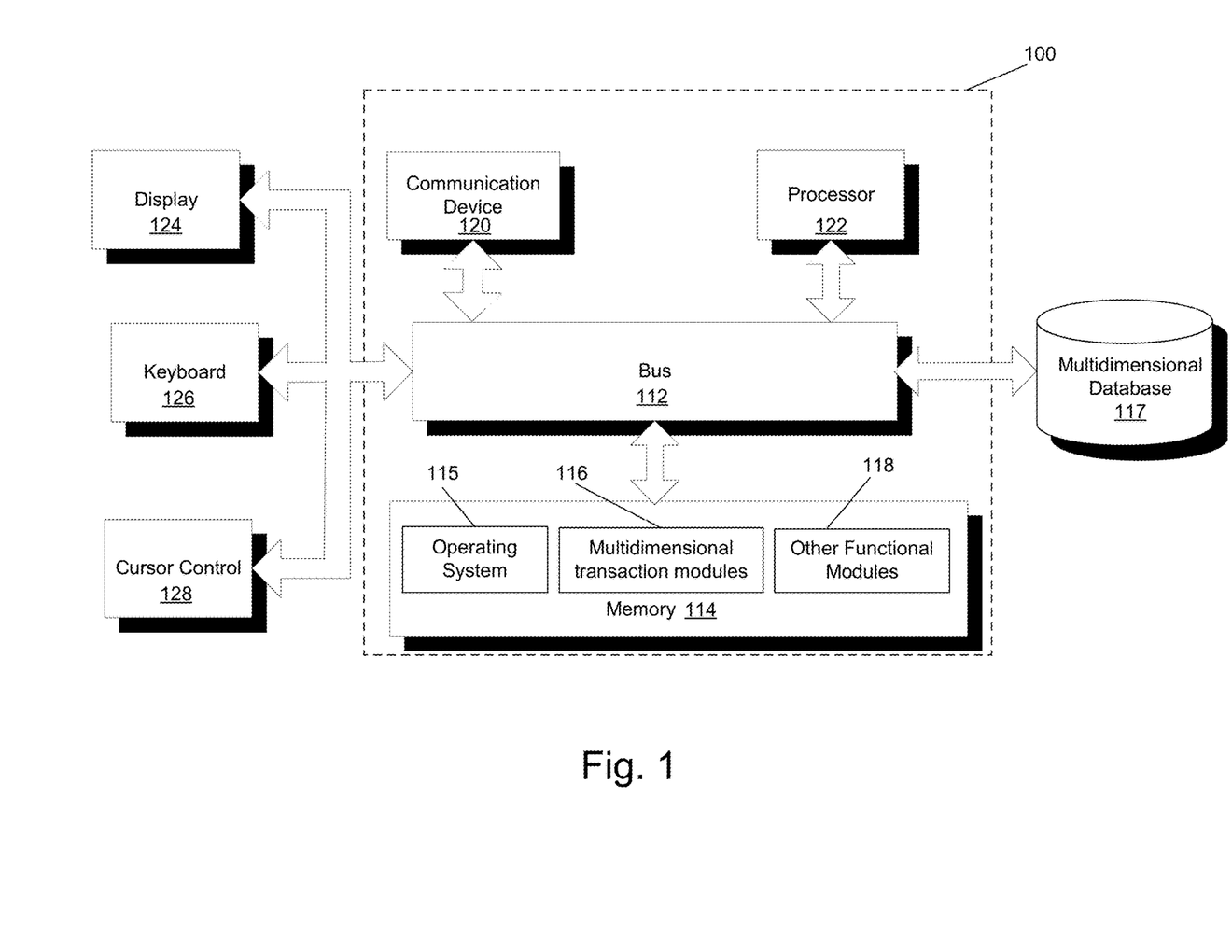
FIG. 1 is a block diagram of a computer server/system in accordance with an example embodiment of the present invention.

FIG. 1 is a block diagram of a computer server/system 100 in accordance with an example embodiment of the present invention.

As shown in FIG. 1, transaction system 100 may include a bus device 112 and/or other communication mechanism(s) configured to communicate information between the various components of transaction system 100, such as processor 122 and memory 114. In addition, communication device 120 may enable connectivity between processor 122 and other devices by encoding data to be sent from processor 122 to another device over a network (not shown) and decoding data received from another system over the network for processor 122.

For example, communication device 120 may include a network interface card that is configured to provide wireless network communications. A variety of wireless communication techniques may be used including infrared, radio, Bluetooth, Wi-Fi, and/or cellular communications. Alternatively, communication device 120 may be configured to provide wired network connection(s), such as an Ethernet connection.

Processor 122 may comprise one or more general or specific purpose processors to perform computation and control functions of transaction system 100. Processor 122 may include a single integrated circuit, such as a microprocessing device, or may include multiple integrated circuit devices and/or circuit boards working in cooperation to accomplish the functions of processor 122.

Transaction system 100 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for transaction system 100. The modules can further include multidimensional transaction modules 116 configured to receive financial information and track computations/transactions to the financial information such as the allocation of funds from point-to-point, as well as other functional modules 118.

In some instances, multidimensional transaction modules 116 may illustrate the movement of the funds from point-to-point, based on rules, on both the sending and receiving side, according to one or more rules. Multidimensional transaction modules 116 enable the rolling back of a transaction to identify and/or illustrate each corresponding rule and its impact on the data, as well as rolling back transactions, rule by rule, to determine the impact of each rule. Multidimensional transaction modules 116 may include one or more application program interfaces ("API") that enable users to monitor the execution of rules and to add, modify, and/or remove rules used to dynamically generate content on webpages. In some instances, multidimensional transaction modules 116 may be implemented as an in-memory configuration that is used to modify and execute rule scripts that control content displayed within a webpage, as will be described in more detail below.

Non-transitory memory 114 may include a variety of computer-readable media that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 122 is further coupled via bus 112 to a display 124, such as a Liquid Crystal Display ("LCD"). A keyboard 126 and a cursor control device 128, such as a computer mouse, are further coupled to communication device 112 to enable a user to interface with transaction system 100.

Transaction system 100 can be part of a larger system. Therefore, transaction system 100 can include one or more additional functional modules 118 to include the additional functionality, such as other applications. A multidimensional database 117 is coupled to bus 112 to provide centralized storage for modules 116 and 118 and to store user profiles, transactions history, etc. Multidimensional dimensional database 117 can store data in an integrated collection of logically-related records or files. In addition, multi-dimensional database 117 can store data using multiple dimensions, with each dimension representing a different view of the data. Each dimension may be part of a corresponding hierarchy (e.g., customers—banks—commercial—based in New York).

In the various embodiments, multidimensional database 117 is a type of database that is optimized for data warehouse and OLAP applications. An OLAP application that accesses data from multidimensional database 117 is known as a multidimensional OLAP ("MOLAP") application. Multidimensional database 117 or a multidimensional database management system ("MDDBMS") provides the ability to rapidly process the data in the database. In one embodiment, the multi-dimensional data structure and database that is used is "Essbase" from Oracle Corp., which is a MDDBMS that provides a multidimensional database platform upon which to build analytic applications. Multidimensional database 117 may further include an operational database, an analytical database, a data warehouse, a distributed database, an end-user database, an external database, a navigational database, an in-memory database, a document-oriented database, a real-time database, an object-oriented database, and the like.

Although illustrated as a single system, the functionality of transaction system 100 may be implemented as a distributed system. Further, the functionality disclosed herein may be implemented on separate servers or devices that may be coupled together over a network. Further, one or more component of transaction system 100 may not be included. For example, for functionality of a user client, transaction system 100 may be a smartphone that includes a processor, memory and a display, but may not include one or more of the other components shown in FIG. 1.

Figure 2:
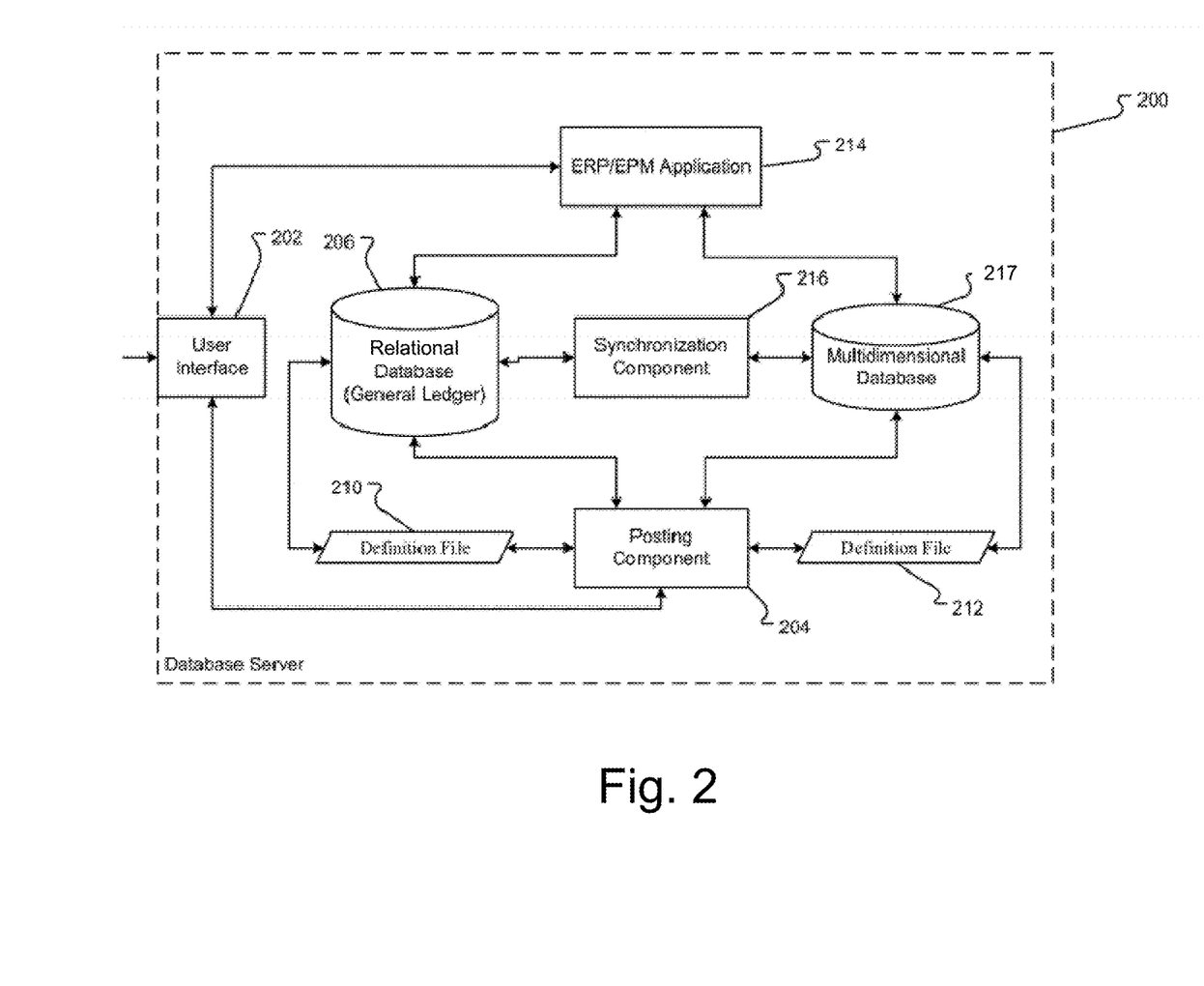
FIG. 2 is a block diagram of a database server in accordance with an example embodiment of the present invention.

FIG. 2 is a block diagram of a database server 200 in accordance with an example embodiment of the present invention. The components described in conjunction with database server 200 can be one or more software applications, modules, objects, etc. However, the function of the software components may be encompassed in hardware as a set of gates or other hardware components. The components perform the functions described herein.

Figure 3:
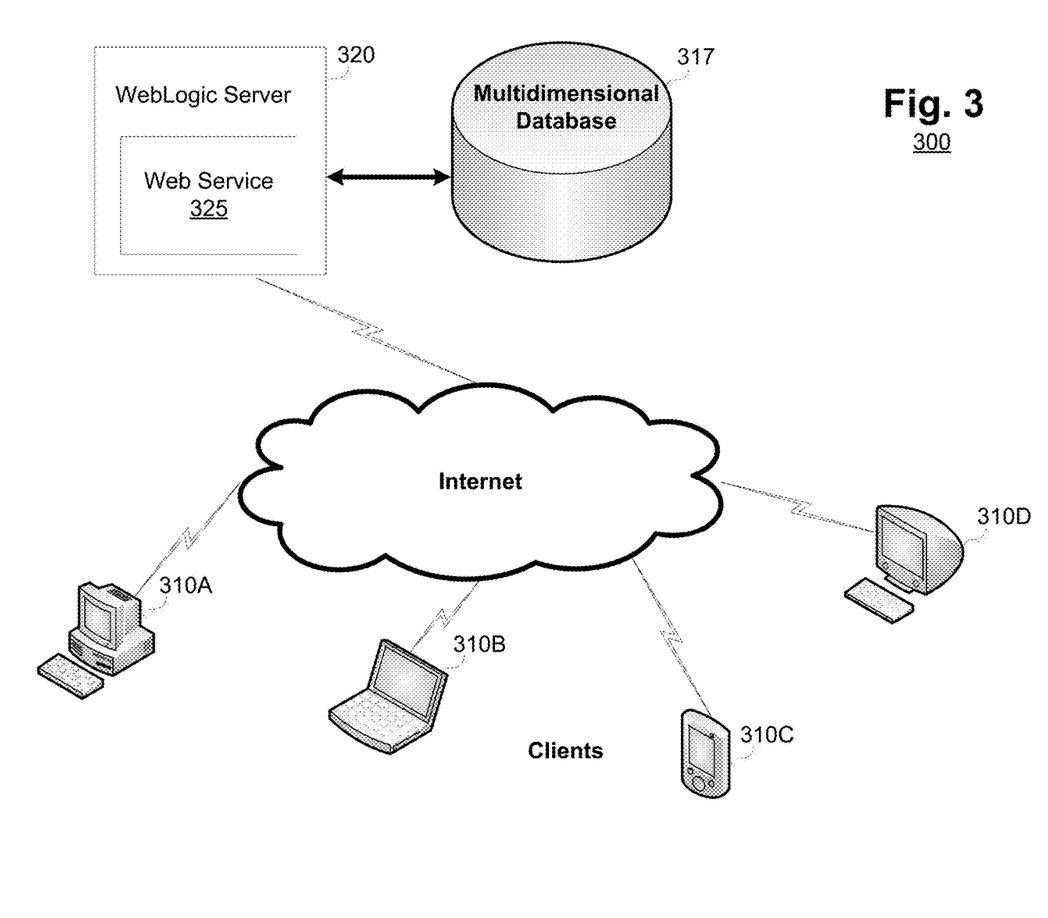
FIG. 3 is a block diagram that illustrates a plurality of clients that access a web service and multidimensional database in accordance with an example embodiment of the present invention.

A user interface 202 receives messages from and sends messages to the database users (e.g., users of client devices 310 of FIG. 3). User interface 202 is configured to generate one or more interfaces for display to the database users. For example, user interface 202 may generate a user interface that graphically depicts and distinguishes raw data and computed data of a multidimensional database. In another example, user interface 202 may enable the user to navigate through a series of transactions.

As part of storing data, user interface 202 can receive financial data and accompanying metadata. The metadata can describe the financial data and inform how the financial data is to be stored. The received financial data and metadata may be sent to a posting component 204. User interface 202 can also allow the database users to interact with the financial data. Thus, user interface 202 can receive requests to retrieve, read, modify, or commit another action on the data. These requests are sent to an enterprise resource planning ("ERP") and/or enterprise performance management ("EPM") application 214.

Posting component 204 manages the storing of financial data into an optional relational database 206 and/or multidimensional database 217, which is preferred. The posting component 204 also manages structural changes to be made to relational database 206 and/or multidimensional database 217. Posting component 204 can receive the financial data and read the metadata included therewith. From the metadata description, posting component 204 determines into which cell within relational database 206 or cube within multidimensional database 217 to store the data. For example, posting component 204 may retrieve a definition file 210 for the relational database 206 or definition file 212 for the multidimensional database 217. The metadata received with the financial data is compared to definitional file 210, 212. Upon finding a match, posting component 204 identifies the cell or cube as receiving the financial data and stores the data into the identified cell or cube.

Data can be stored in a cell of relational database 206 is defined by a row and a column. Relational database 206 may be the general ledger for an account. In contrast, multidimensional database 217 is an OLAP database arranged in several dimensions and having transaction oriented functions. The dimensions define cubes of data. Multidimensional database 217 allows complex analytical and ad-hoc queries for data, while such analysis is not easily provided by relational database 206. For example, relational database 206 is best suited for recording large volumes of information. However, multidimensional database 217 is best suited for complex analytical and ad-hoc queries which managers need in order to be able to make decisions. In addition, multidimensional database 217 is equipped with transaction oriented functionality which is enabled by additional dimensions to that are used to execute the transactions and track the progress of those transactions.

In some instances, each cell of relational database 206 can be mapped to a cube in multidimensional database 217. Thus, data stored into relational database 206 may be simultaneously stored in the corresponding mapped cube in multidimensional database 217 or the related data may be synchronized at a later time.

Typically, a general ledger is an ERP application, whereas analytical application and multidimensional databases traditionally have EPM functionality. Accordingly, and in accordance with embodiments of the present invention, ERP/EPM application 214 may be configured to provide both ERP and EPM functions using separate or integrated applications. ERP/EPM application 214 may operate to provide or modify data in response to user requests in either relational database 206 and/or multidimensional database 217.

A synchronization component 216 may provide a function for ensuring data in multidimensional database 217 and relational database 206 is the same. For example, if new data is posted by posting component 204 in only relational database 206, synchronization component 216 can copy the data from relational database 206 into a corresponding cube in multidimensional database 217. To effect the copy of data, synchronization component 216 may read the mapping of the cells in the definition file 210, 212. The mapping identifies where changed data should be placed in the other database. In some configurations, a change in relational database 206 or multidimensional database 217 may be signaled by the setting of a dirty bit or other similar identifier. Synchronization component 216 may synchronize data between the relational database 206 and the multidimensional database 217 upon a user command, automatically in response to a change, or periodically.

FIG. 3 is a block diagram 300 that illustrates a plurality of clients that access a web service and the multidimensional database in accordance with an example embodiment of the present invention.

As shown in FIG. 3, block diagram 300 includes clients 310A, 310B, 310C, 310D that access a web service 325 (i.e., a web service that provides transaction oriented functions for a multidimensional database as described herein) that is implemented on a WebLogic server 320 from Oracle Corp. in one embodiment. Web service 325 accesses multidimensional database 317. Each client 310A, 310B, 310C, 310D executes a browser or other functionality to allow a user to access web service 325 over the Internet or another connection. In other embodiments, other implementations of a web service can be used.

In the various embodiments, user interfaces and associated methods for using an electronic device, such as clients 310A, 310B, 310C, 310D, are described. In some embodiments, the electronic device is a portable communication device such as a mobile phone, smartphone, tablet, and the like. The user interface may include a touchscreen and/or other input/output devices. It should be understood, however, that the user interfaces and associated methods may be applied to other devices, such as personal computers, laptops, and the like which may include one or more other physical user-interface devices, such as a keyboard and or mouse.

Figure 4:
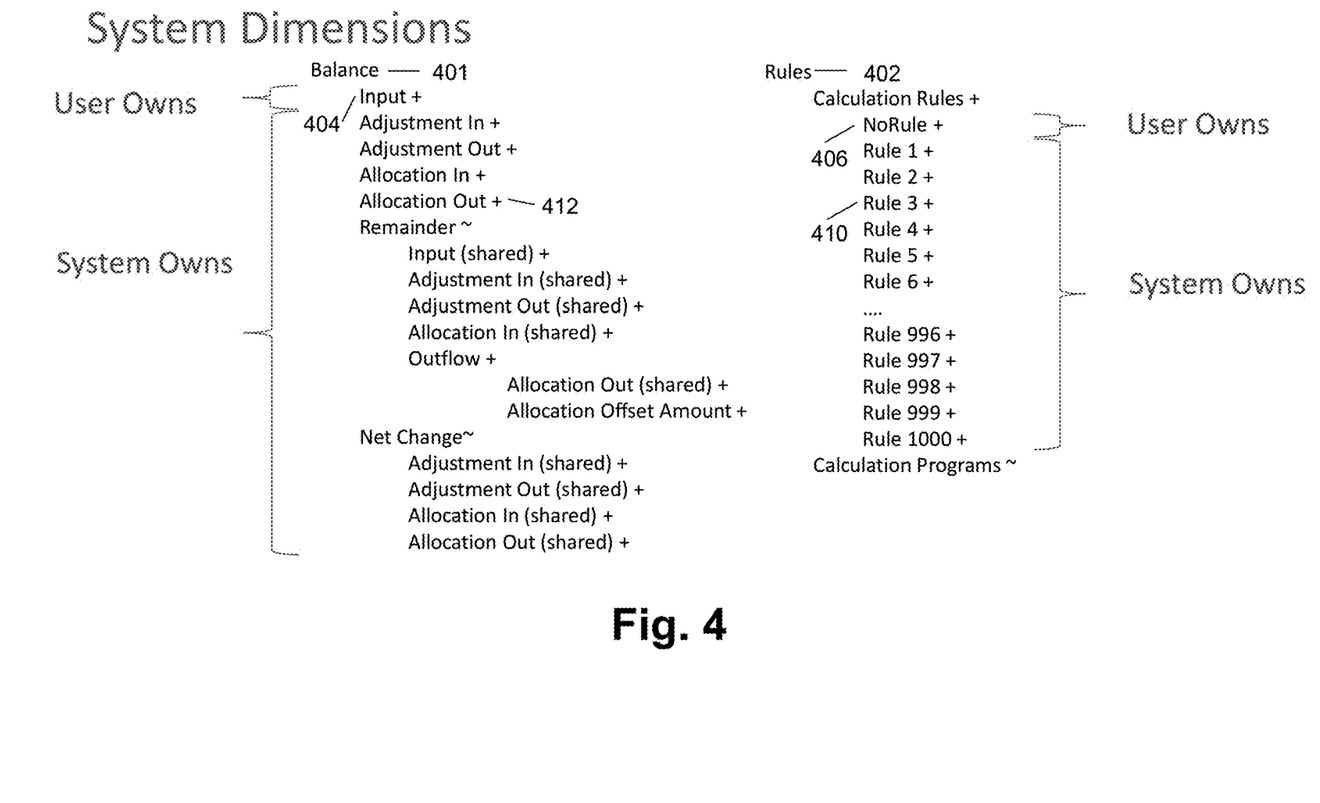
FIG. 4 illustrates transactional dimensions of a multidimensional database in accordance with an example embodiment.

FIG. 4 illustrates transactional dimensions of a multidimensional database in accordance with an example embodiment.

As described above, multidimensional database information is generally organized according to a plurality of dimensions. Each dimension may be organized hierarchically. By contrast, relational databases utilize tables with rows and columns. As will now be described, the embodiments of the present invention introduce transaction tracking dimensions (e.g., 401, 402) to multidimensional databases. For example, one embodiment receives data (e.g., financial data) and represents the received data as multidimensional data. In addition, a plurality (e.g., two) of additional dimensions is utilized to describe or otherwise store the underlying nature of received data (e.g., is it raw data, or data that was generated as part of a transaction, such as movement from one department or account to another). FIG. 4 also illustrates the displaying and editing of a hierarchical structure represented in a multidimensional database structure.

As shown in FIG. 4, the transactions of the received data may be traced by introducing particular transaction tracking dimensions to the multidimensional database. In this example, balance dimension 401 and rules dimension 402 are added to the multidimensional data. When raw data (i.e., data that begins the process or that was given to the user) is received, it is attached to the input item 404 within balance dimension 401 as well as the no-rule item 406 on rules dimension 402. The calculation of the data is then layered on through allocations or other custom calculations, etc. For example, a different rule may be applied at each layer. Here, data is written to balance dimension 401 and rule dimension 402 corresponding to the rule number and type of transaction.

Therefore, through the layering, raw data is isolated from calculated data and the rule that caused the data to be calculated can be identified. For example, rule element 410 (i.e., "Rule 3") caused a changed to data element 412 (i.e., "Allocation Out"). Therefore, in this example, the data is constructed similar to a financial ledger, however, the data now includes the added dimensions of balance dimension 401 and rules dimension 402 to track the progress of the individual steps as a data stripe. In some embodiments, offsetting entries (e.g., element 751 of FIG. 7) may be posted against one or more rules that resulted in a change to the data so that both sides of a balanced transaction may be tracked and viewed. For example, for every "AllocationOut" there is a corresponding "AllocationIn" posted against the same rule, but at a different combination of the other dimensions (e.g., account or department).

Accordingly, a rollback can be performed if the user determines that the calculations were done incorrectly (e.g., the values or the logic in apportioning money is not correct). The added dimensions balance dimension 401 and rules dimension 402 function as a tracing mechanism for the calculations on the data on a step-by-step basis, similar to peeling back the layers of an onion. Thus, the additional dimensions to multidimensional data are used to execute the transactions as well as to track the progress of those transactions. The embodiments further enable the rolling back to a starting point of a series of computations/transactions if desired, or to any point in-between. Known multidimensional databases do have not provide this rolling back functionality.

In addition, the embodiments include a variety of graphical user interfaces for managing rules. For example, a manage rules screen may provide a single screen for defining all calculation logic required to support the user reporting needs. The graphical user interfaces may be configured for a business analyst/financial analyst who has deep domain experience in the computation and reporting methods of a management reporting project, but may not have very much experience with Essbase and scripting syntax or programming languages. The graphical user interfaces utilize programming concepts, but present them in such a fashion that they are easily understood by the target user with a minimal amount of training.

Figure 5:
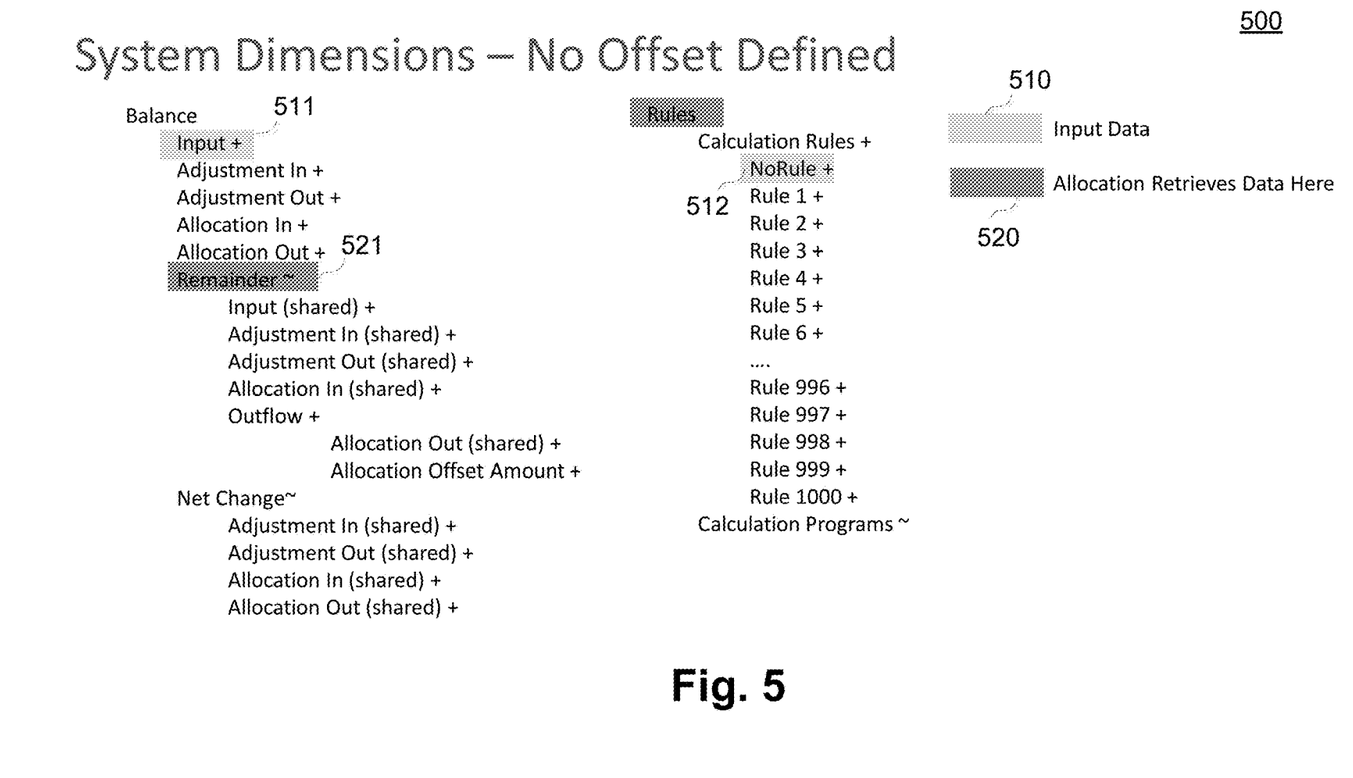
FIG. 5 represents an example visual representation for providing visual cues that graphically depict and distinguish raw data and computed data of a multidimensional database in accordance with an example embodiment.

FIG. 5 represents an example visual representation 500 for providing visual cues that graphically depict and distinguish raw data and computed data of a multidimensional database in accordance with an example embodiment. In FIG. 5, raw data or input data 510 is graphically rendered with one or more graphical cues that distinguish it from computed data, such as allocation data 520. In this example, input 511 is unchanged by no-rule 512, and remainder 521 has been modified by one or more rules (not shown).

Figure 6:
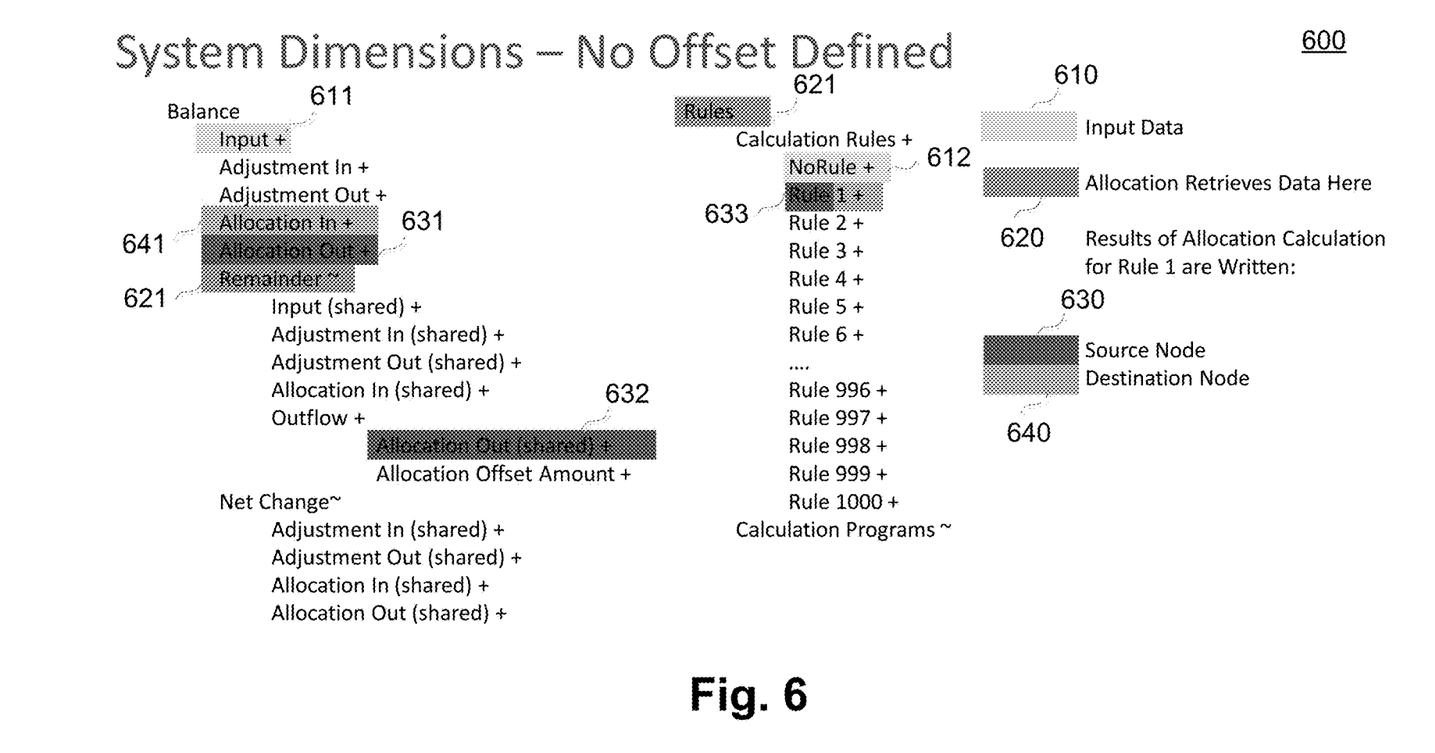
FIG. 6 represents an example visual representation for providing visual cues that graphically depict and distinguish raw data and computed data of a multidimensional database in accordance with another example embodiment.

FIG. 6 represents an example visual representation 600 for providing visual cues that graphically depict and distinguish raw data and computed data of a multidimensional database in accordance with another example embodiment. In this example, data that is moved and the rules that moved data to and from a particular location may be graphically rendered and/or identified. Similar to FIG. 5, input data 610 is graphically rendered with one or more graphical cues that distinguish it from allocation data 620. Input 611 is unchanged by no-rule 612. Data element 621 (i.e., "Remainder") has been modified by one or more rules (not shown). In this example, however, additional changes and movements of data are shown. Alternatively, each of the changes that are identified in FIG. 6 may result because of the execution of a single rule. The changes illustrate which locations (i.e., other dimension intersections) have had data written using the rule and balance dimensions because of the rule executed. AllocationIn and AllocationOut are written to different locations and the Remainder hierarchy is setup to compute what is left at the Source, and thus available for future allocations after the allocation rule executes. Source data 630 is graphically distinguished from destination data 640. For example, data elements 631, 632 (i.e., "Allocation Out") are source data within an ongoing transaction, and data element 641 (i.e., "Allocation In") is destination data within the transaction. In this example, data elements 631, 641 were each altered by rule element 633.

Figure 7:
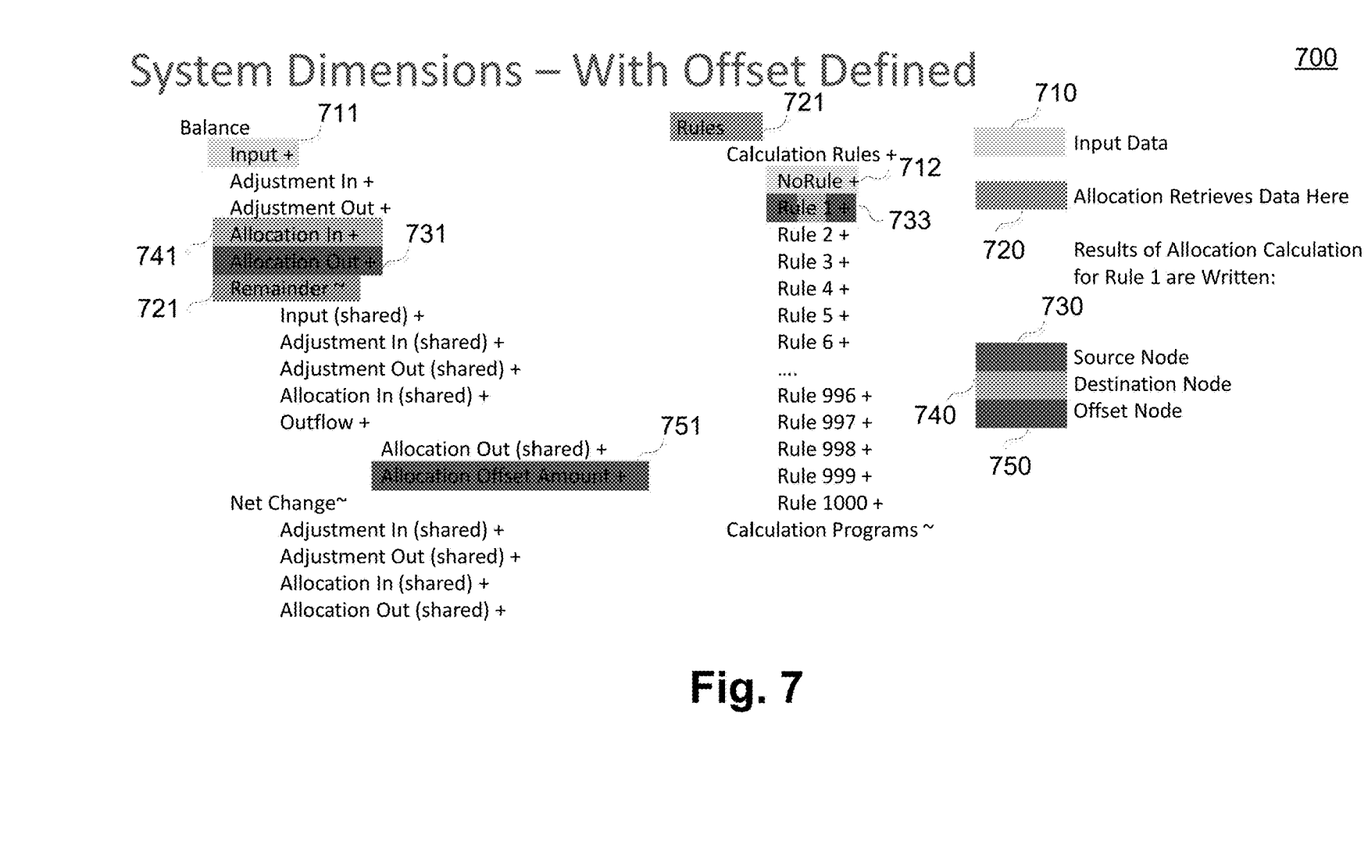
FIG. 7 represents an example visual representation for providing visual cues that graphically depict and distinguish raw data and computed data of a multidimensional database in accordance with yet another example embodiment.

FIG. 7 represents an example visual representation 700 for providing visual cues that graphically depict and distinguish raw data and computed data of a multidimensional database in accordance with yet another example embodiment. The visual representation 700 of FIG. 7 illustrates offsetting (i.e., balancing) entries, such as data element 751, that are not written to the source location, but to another location instead. As a result, a valid Remainder amount may be tracked at the source, such as source node 730, even though balancing entries were posted elsewhere.

In this example, data that is moved or offset and the rules that moved or offset the data are graphically identified. Similar to FIGS. 5 and 6, input data 710 is graphically rendered with one or more graphical cues that distinguish it from allocation data 720. Input 711 is unchanged by no-rule 712. Data element 721 (i.e., "Remainder") has been modified by one or more rules (not shown). Source data 730 is graphically distinguished from destination data 740. For example, data element 751 (i.e., "Allocation Offset Amount") is source data within an ongoing transaction, and data element 741 (i.e., "Allocation In") is destination data within the transaction. Further, data element 731 (i.e., "Allocation Out") has been offset within the ongoing transaction, and data elements 731, 741, 751 were each altered by rule element 733. Offset nodes 750 are an alternative location for writing a balancing entry.

Although various highlights are depicted in FIGS. 5-7 to graphically distinguish different types of data, the embodiments are not limited to any particular type of visual cues. Instead, a variety of graphical cues may be used.

In the various embodiments of FIGS. 4-7, "Allocation In" values written to a destination location must also have a corresponding "Allocation Out" value written in order to maintain balance in the data. There are cases where it is preferable to write a balancing entry to a location different than the allocation source. In this case an alternate Offset location can be specified. Even in cases where an alternate offset is used, the balance mechanism still allows the amount allocated from a source by a rule to be tracked, this amount is referred to as an "Allocation Offset Amount". This allows the Remainder to be accurate even though the balancing entry was not written to the source node.

The extra two dimensions in one embodiment are used to store information regarding the data calculations. As shown, the user's input data (e.g., input 511, 611, 711) is never overwritten or otherwise interfered with. Instead, changes are tracked. For example, multidimensional transaction modules 116 track where money moves to and from by the rule that caused it to move. The various embodiments further include the ability to identify and isolate values that were produced as a result of an input or a prior calculation. The multidimensional transaction modules further include the ability to ensure that if funds have already been allocated out of an account. Subsequent rules will not operate on that account where there is no money left through a special case of Offset use.

In some embodiments, multidimensional transaction modules 116 include performance enhancements since calculations can be done in parallel. The rules in one embodiment have sequence numbers, and can run in parallel if they have the same sequence numbers. Analysis of profits and costs can be performed for individual products and customers, as opposed to the entire company.

Embodiments thus allow a user to dissect all of the computations and rules that moved data from raw data to its final result, and all computations in between. Therefore, an audit trail of all movement is created. Further, embodiments allow the movements/computations to be reversed step by step so all transactions can ultimately be reversed. Having a chain of data movement stored at a lower level granularity with the above artifacts provides considerable business and technical benefits.

Figure 8:
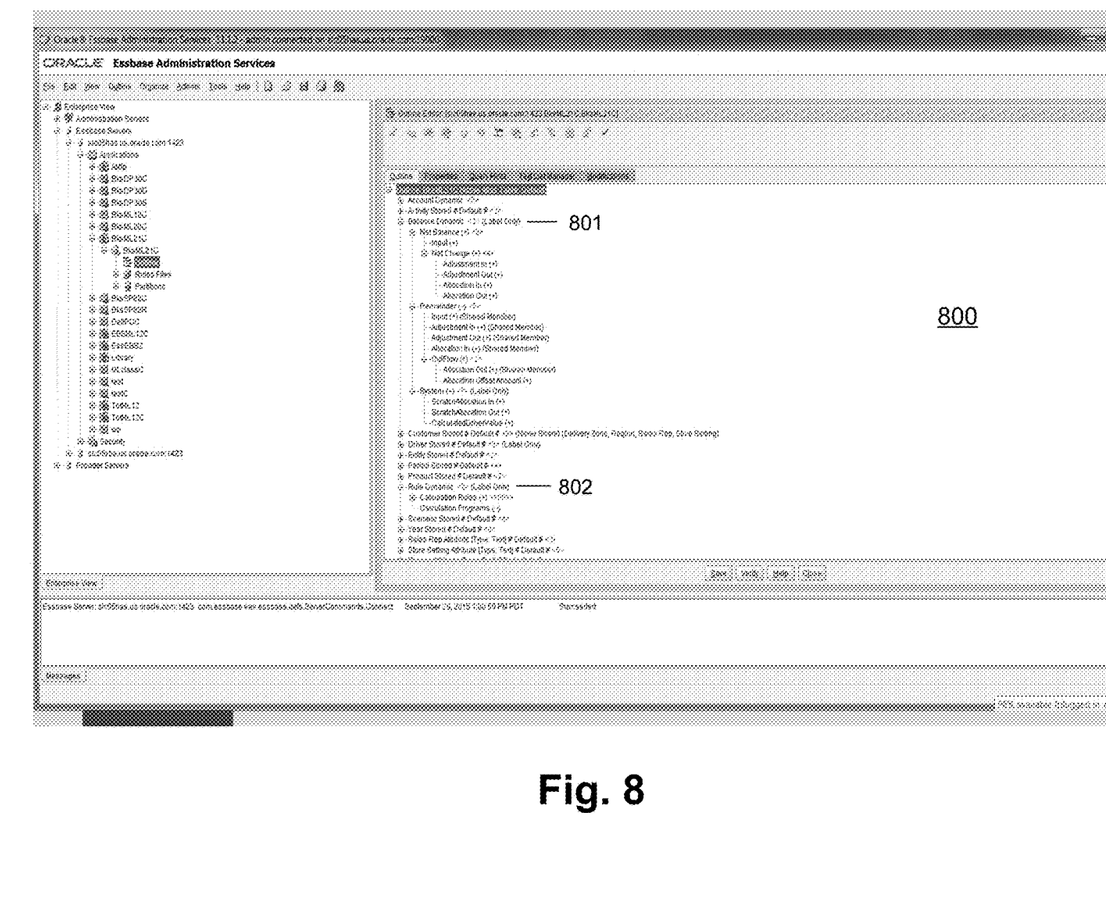
FIG. 8 illustrates an Essbase data structure in accordance with one embodiment that includes the two added dimensions, rules and balances.

FIG. 8 illustrates an Essbase data structure 800 in accordance with an example embodiment. Essbase data structure 800 includes the two added dimensions, balance dimension 801 and rules dimension 802, as described above. Essbase data structure 800 also may be used to illustrate the displaying and editing of hierarchical structures represented in the multidimensional databases.

Using Essbase data structure 800, for example, striped allocation enabling the user to undo and redo financial computations/transactions is provided. The undo/redo functionality is designed to track calculations efficiently using the capabilities of an Essbase aggregate storage option ("ASO") cube as compared to Essbase block storage option ("BSO") cubes. Using the aggregation capabilities of ASO, the embodiments include ASO allocation and custom calculation calls in Essbase to convert the rules from the rule set reading the source, destination, driver and offset dimensions after identifying the rule in which category it falls based on what call is made.

In a generic example, the chain of allocation may have the following hierarchy, where rulesets are groups of rules.
Ruleset A
   Rule A1
   Rule A2
Ruleset B
   Rule B1
   Rule B2
   Rule B3
Ruleset C
   Rule C1

In this example, a user may trace back from Rule C1 to Rule B2 to Rule A1 across Rulesets A, B, C. Rulesets A, B, C generally reflect a higher order business concept (e.g., a methodology of allocation) compared to the corresponding Rules. This hierarchy is defined in a visual representation and stored in the multidimensional database data structure.

Figure 9:
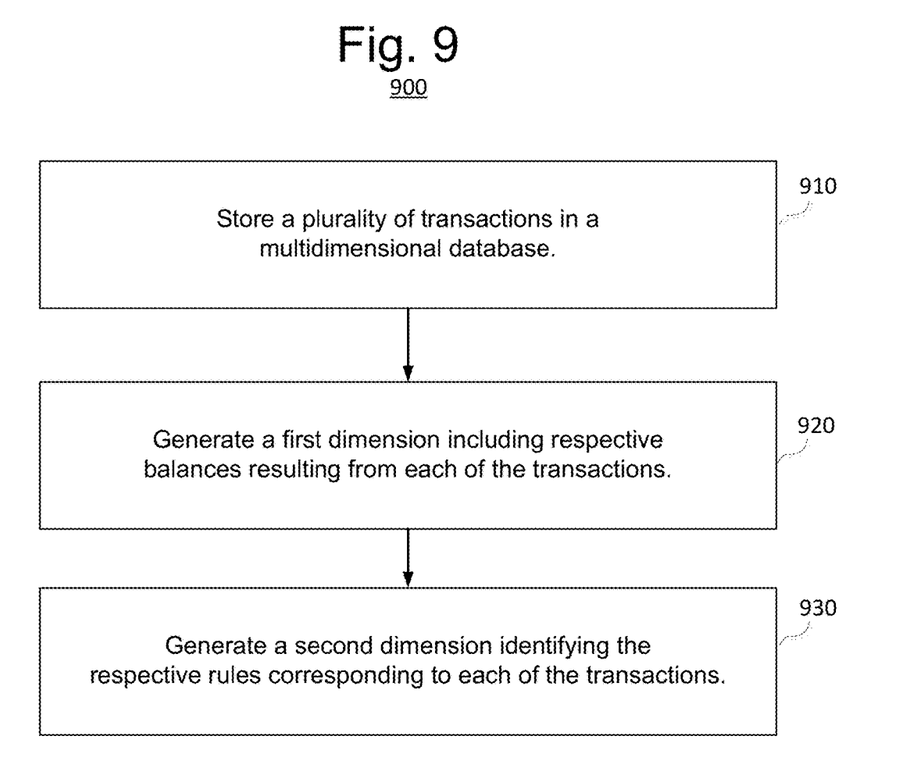
FIG. 9 illustrates a flow diagram for enabling transaction oriented functions for a multidimensional database in accordance with an example embodiment of the present invention.

FIG. 9 illustrates a flow diagram 900 for enabling transaction oriented functions for a multidimensional database in accordance with an example embodiment of the present invention. In one embodiment, the functionality of the flow diagram 900 of FIG. 9 described below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 910, flow diagram 900 stores a plurality of transactions in a multidimensional database. Next, at 920, flow diagram 900 generates a first dimension including respective balances resulting from each of the transactions. Lastly, at 930, flow diagram 900 generates a second dimension identifying the respective rules corresponding to each of the transactions.

In view of the above, the embodiments of the present invention provide a multidimensional database that receives financial information and tracks computations and other transactions to the financial information, such as the allocation of funds from point-to-point. In an example embodiment, the multidimensional transaction modules are configured to visually depict the movement of the funds from point-to-point, based on rules, on both the sending and receiving side, in one or more steps (i.e., "rules"). Every step of an allocation can have one or more corresponding rules. Further, the embodiments provide the ability to roll back the movement of funds to show each corresponding rule and its impact on the data, as well as rolling back transactions, rule by rule, to determine the impact of each rule, all the way to the starting point of a transaction (e.g., point where a certain fund was received). The embodiments allow for better debugging of aggregated results and provides for what-if scenarios. In addition, business analysts are provided with tools that easily allow for different aggregations from striped allocations.

One having ordinary skill in the art will readily understand that the invention as discussed above may be practiced with steps in a different order, and/or with elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed:

1. A method for enabling transaction oriented functions within a multidimensional database, the method comprising:
   receiving financial data generated in response to a plurality of transactions;
   storing the financial data as multidimensional data in the multidimensional database, the multidimensional database comprising a plurality of dimensions, the dimensions comprising a balance dimension that stores a balance of the financial data at each of the transactions as data elements, and a rules dimension that stores each of a plurality of rules used to execute the plurality of transaction as rule elements;
   generating a visual representation of the data elements of the balance dimension and the rule elements of the rules dimension, the visual representation comprising visual cues that distinguishes between raw financial data and calculated financial data in the balance dimension, and that, for each of the calculated financial data, a corresponding rule element of the rules dimension that caused a calculation to generate the calculated financial data.

2. The method according to claim 1, further comprising rolling back at least one of the transactions using one of the balance dimension or the rules dimension.

3. The method according to claim 1, further comprising rolling back through the rules dimension to a starting point of the plurality of transactions.

4. The method according to claim 1, further comprising a first visual cue for a first rule elements that indicates that the first rule element caused calculated financial data for two or more corresponding data elements of the balance dimension.

5. The method according to claim 1, further comprising graphically identifying a movement of money between two entities based on the plurality of transactions.

6. The method according to claim 1, wherein input data of the transactions is unchanged after execution of the transactions.

7. The method according to claim 2, wherein the multidimensional database comprises an Essbase data structure comprising an aggregate storage option cube and using striped allocation and the rolling back comprises enabling undo functionality of the striped allocation.

8. The method according to claim 1, further comprising computing a remainder value or balancing value after each successive execution of the rules.

9. A device comprising:
   a processor; and
   a memory storing one or more programs for execution by the processor, the one or more programs including instructions for:
      receiving financial data generated in response to a plurality of transactions;
      storing the financial data as multidimensional data in a multidimensional database, the multidimensional database comprising a plurality of dimensions, the dimensions comprising a balance dimension that stores a balance of the financial data at each of the transactions as data elements, and a rules dimension that stores each of a plurality of rules used to execute the plurality of transaction as rule elements;
      generating
      a visual representation of the data elements of the balance dimension and the rule elements of the rules dimension, the visual representation comprising visual cues that distinguishes between raw financial data and calculated financial data in the balance dimension, and that, for each of the calculated financial data, a corresponding rule element of the rules dimension that caused a calculation to generate the calculated financial data.

10. The device according to claim 9, further comprising instructions for rolling back at least one of the transactions using one of the balance dimension or the rules dimension.

11. The device according to claim 9, further comprising instructions for rolling back through the rules dimension to a starting point of the plurality of transactions.

12. The device according to claim 9, further comprising a first visual cue for a first rule elements that indicates that the first rule element caused calculated financial data for two or more corresponding data elements of the balance dimension.

13. The device according to claim 9, further comprising instructions for graphically identifying a movement of money between two entities based on the plurality of transactions.

14. The device according to claim 10, wherein the multidimensional database comprises an Essbase data structure comprising an aggregate storage option cube and using striped allocation and the rolling back comprises enabling undo functionality of the striped allocation.

15. The device according to claim 9, further comprising instructions for computing a remainder value or balancing value after each successive execution of the rules.

16. A non-transitory computer readable storage medium storing one or more programs configured to be executed by a processor, the one or more programs comprising instructions for:
   receiving financial data generated in response to a plurality of transactions;
   storing the financial data as multidimensional data in a multidimensional database, the multidimensional database comprising a plurality of dimensions, the dimensions comprising a balance dimension that stores a balance of the financial data at each of the transactions as data elements, and a rules dimension that stores each of a plurality of rules used to execute the plurality of transaction as rule elements;
   generating
   a visual representation of the data elements of the balance dimension and the rule elements of the rules dimension, the visual representation comprising visual cues that distinguishes between raw financial data and calculated financial data in the balance dimension, and that, for each of the calculated financial data, a corresponding rule element of the rules dimension that caused a calculation to generate the calculated financial data.

17. The non-transitory computer readable storage medium of claim 16, further comprising instructions for rolling back at least one of the transactions using one of the balance dimension or the rules dimension.

18. The non-transitory computer readable storage medium of claim 16, further comprising instructions for rolling back through the rules dimension to a starting point of the plurality of transactions.

19. The non-transitory computer readable storage medium of claim 17, wherein the multidimensional database comprises an Essbase data structure comprising an aggregate storage option cube and using striped allocation and the rolling back comprises enabling undo functionality of the striped allocation.

20. The non-transitory computer readable storage medium of claim 16, further comprising a first visual cue for a first rule elements that indicates that the first rule element caused calculated financial data for two or more corresponding data elements of the balance dimension.

* * * * *